United States Patent [11] 3,620,796

| [72] | Inventor | Travis L. Gordy |
| | | Ponca City, Okla. |
| [21] | Appl. No. | 791,541 |
| [22] | Filed | Jan. 13, 1969 |
| [45] | Patented | Nov. 16, 1971 |
| [73] | Assignee | Continental Oil Company |
| | | Ponca City, Okla. |

[54] SUBSTRATES HAVING STRIPPABLE PROTECTIVE COATINGS
15 Claims, No Drawings

| [52] | U.S. Cl. | 117/6, 117/5.5, 117/161 H, 117/168, 260/28.5 AV |
| [51] | Int. Cl. | B65b 33/00, B44d 1/34 |
| [50] | Field of Search | 117/6, 168, 5.5, 161 UH; 260/28.5 AV |

[56] References Cited
UNITED STATES PATENTS

| 3,207,716 | 9/1965 | Lippoldt | 260/28.5 |
| 3,489,705 | 1/1970 | Zmitrovis et al. | 117/6 |

Primary Examiner—Alfred L. Leavitt
Assistant Examiner—M. F. Esposito
Attorneys—Joseph C. Kotarski, Henry H. Huth, Jerry B. Peterson, Bayless E. Rutherford, Jr. and Carroll Palmer ABSTRACT: This disclosure concerns an article of manufacture comprising a substrate e.g. automobile molding) having a readily strippable protective coating of a composition comprising petroleum wax and an ethylene-vinyl acetate copolymer containing from 16 to 22 percent vinyl acetate. In some instances an ethylene-isobutyl acrylate copolymer may be substituted for a portion of the ethylene-vinyl acetate copolymer.

SUBSTRATES HAVING STRIPPABLE PROTECTIVE COATINGS

BACKGROUND

The present invention concerns the protection of articles of manufacture during shipment and other handling prior to the ultimate use of the article. The following description illustrates one use for my invention.

The present-day automobile uses a variety of moldings on the body. Often it is necessary for the owner to have these moldings replaced by the local dealer. The dealer usually has one or more of the moldings in stock, which in turn are obtained from a regional warehouse, wherein turn the part is obtained from a general warehouse. It is thus apparent that a single molding may be subjected to three or more handlings before it is finally installed on the automobile. Because of this large amount of handling the molding is subject to damage due to scratching, dropping and other acts. One means of protecting the molding is to provide it with a protective coating which is easily removable, for example by stripping. In order to be suitable as a strippable coating for this use a coating composition must meet several requisites, such as the following:

1. it must be easily applied;
2. it must have very little (generally nil) adhesion to the substrate which is coated;
3. it must have sufficient cohesive strength so that it is easily removed by pulling—for example, usually, it will come off in a single piece.

Under certain usages, it is desirable that the composition have the following properties:

1. where the coated article is handled in hotter climates it must provide a continuous film at temperatures up to 150° F.
2. where the article to be coated is made of soft material the composition must provide either a hard film or a shock absorbing film to protect the surface.

I have found that articles of manufacture, for example, automobile body mouldings, can be protected during shipment and other handling by the use of a coating of a composition comprising petroleum wax and specific wax/ethylene-vinyl acetate copolymers. The use of these particular ethylene-vinyl acetate copolymers in the composition eliminates the need for a release agent. Replacement of a portion of the ethylene-vinyl acetate copolymer by an ethylene-isobutyl acrylate copolymer improves the high temperature storage stability of the coatings.

While the preceding illustration has been concerned with automatic moldings, it is readily apparent that my invention can be used to protect a variety of substrates and/or articles of manufacture.

PRIOR ART

U.S. Pat. No. 3,207,716, to Richard F. Lippoldt, teaches strippable coating compositions which comprise paraffin wax, ethylene-vinyl acetate copolymer and a release agent. The patent teaches that the ethylene-vinyl acetate copolymer have a vinyl acetate content of from about 10–40 percent by weight, and, *more preferably from about 25–35 percent by weight*. Moreover, the patent teaches that a release agent is a necessary ingredient of the composition.

My invention resides in the discovery that petroleum wax-ethylene/vinyl acetate copolymer compositions do not require a release agent when the ethylene-vinyl acetate copolymer contains from about 16 to about 22 percent by weight, preferably from about 17 to about 20 percent by weight, vinyl acetate.

BRIEF SUMMARY OF THE INVENTION

Broadly stated, the the present invention relates to the following aspects:

A composition, suitable for forming a readily strippable coating on a substrate, comprising petroleum wax and a combination of ethylene-vinyl acetate and ethylene-isobutyl acrylate copolymers.

As an article of manufacture, a substrate having a readily strippable, protective coating of a composition comprising petroleum wax and an ethylene-vinyl acetate copolymer containing about 16 to about 22 weight percent vinyl acetate and having a melt index of from about 1.5 to about 200.

A method of protecting metal and plastic articles while in shipment, said method comprising:
 a. applying to the article a coating of a composition comprising petroleum wax and an ethylene-vinyl acetate copolymer of the type described immediately above,
 b. if desired, after shipment and prior to use of said article, removing therefrom said coating.

If desired, in order to improve the high temperature storage stability of the coatings, a portion of the ethylene-vinyl acetate copolymer in the composition can be replaced by an ethylene-isobutyl acrylate copolymer.

DETAILED DESCRIPTION The term "petroleum wax" as used herein refers to paraffin wax, microcrystalline wax or mixtures thereof.

The term "paraffin wax" is used to define the hard, crystalline wax commonly obtained from petroleum distillates, derived from mineral oils of the mixed-base or paraffin-base type. By the present refining methods, crude petroleum oil is subjected to distillation whereby it is separated into a series of fractions known as "paraffin distillates". The wax is separated from the oil by mixing the paraffin distillate with a solvent (as for example a ketone, such as methyl ethyl ketone), chilling the mixture to solidify the wax and filtering. The wax obtained contains from about 10 to about 25 percent oil and is generally referred to as "slack wax." The oil is separated from the wax by mixing the slack wax with more of the same solvent, and again chilling and filtering. The old method of sweating oil from wax has been largely replaced by the solvent method. The final product is known as "refined wax" or "-paraffin wax" and is graded according to the tensile strength, melting point, oil content, hardness, etc.

The term "microcrystalline wax" refers to a wax material which is obtained usually from the residual product of the vacuum distillation of lubricating oils. In general, microcrystalline waxes contain only very minor quantities of straight chain paraffinic hydrocarbons. For additional information concerning the properties and preparation of microcrystalline waxes, I refer to U.S. Pat. No. 2,983,664 by Concetto T. Camilli.

When the coating composition contains both ethylene-vinyl acetate copolymer and ethylene-isobutyl acrylate copolymer and wherein the contemplated usage is in hotter climates, the wax must have a relatively high melting point. When the coated article is to be stored in hotter climates, the coating must be able to withstand temperatures up to about 150° F. Such usage requires a wax having a melting point of at least about 160° F. When the coated article does not have to withstand such high temperatures the melting point of the wax is not critical. The only requirement is that the melting point be a few degrees above the maximum temperature reached during storing or transporting.

Ethylene-vinyl acetate copolymers are prepared by copolymerizing a mixture of ethylene and vinyl acetate in the presence of a free radical catalyst, e.g. tertiary butyl hydroperoxide, in a suitable reactor at elevated temperatures and pressures. The copolymers are usually identified by a combination of the ratios of comonomers present in the product and by the melt index. The test for determining melt index (ASTMD–1238–57T) consists of determining the amount in grams (melt index value) of the copolymer that can be pressed through a standard orifice in ten minutes at 190° C. with a piston weighing 2160 grams. Suitable ethylene-vinyl acetate copolymers for use in my invention contain from about 16 to about 22 weight percent vinyl acetate and have a melt index of from about 1.5 to about 200. The preferred ethylene-vinyl acetate copolymers contain from about 17 to about 20 weight percent vinyl acetate and have a melt index of from about 2 to about 30.

Both suitable and preferred ethylene-vinyl acetate copolymers are available from E. I. du Pont de Nemours and Co. under the "ELVAX" trademark and from Union Carbide Corp. under the trademark "CO-MER EVA." The vinyl acetate content and melt index of some typical suitable and preferred ethylene-vinyl acetate copolymers are shown below:

| Copolymer | Vinyl Acetate Weight % | Melt Index |
| --- | --- | --- |
| ELVAX 420 | 17–19 | 125–175 |
| ELVAX 460 | 17–19 | 2.1–2.9 |
| CO-MER EVA-303 | 18 | 125 |
| CO-MER EVA-305 | 20 | 28 |
| CO-MER EVA-308 | 18 | 2.5 |

The preparation of ethylene-isobutyl acrylate copolymers is similar to that for ethylene-vinyl acetate copolymers. Suitable ethylene-isobutyl acrylate copolymers for use in my invention contain from about 68 to about 82 percent ethylene (by weight) and from about 18 to about 32 percent isobutyl acrylate (by weight) and have melt indexes in the range of from about 2 to about 260.

Particularly suitable ethylene-isobutyl acrylate copolymers are available from The Dow Chemical Company under the trademark "ZETAFAX." Physical properties of some particularly suitable ethylene-isobutyl acrylate copolymers are shown in the table below.

| | Zetafax 1278 | Copolymer Zetafax 1370 | Zetafax 1375 |
| --- | --- | --- | --- |
| Isobutyl Acrylate Content (% by weight) | 18–22 | 28–32 | 28–32 |
| Physical Property: | | | |
| Melt Index | 240–260 | 2–3 | 20 |
| Solution Viscosity, cps* | 0.065 | 0.116 | 0.081 |
| Density, g./cc. | 0.926 | 0.925 | 0.923 |
| Bulk Density, g./cc. | 0.48 | 0.48 | 0.48 |
| Tensile, p.s.i. | 610 | 1290 | 920 |
| Elongation, % | 640 | 770 | 825 |
| Yield Strength, p.s.i. | 450 | 257 | 345 |
| Hardness, Shore "D" | 30 | 26 | 28 |
| Vicat Softening Point, °F. | 105 | 100 | 104 |
| Low Temperature Flexibility, °C. | −45 | <−70 | <−70 |

*0.1 g./100 ml. decahydronaphthalene at 135 °C.

Another particularly suitable ethylene-isobutyl acrylate copolymer is available from E. I. du Pont de Nemours and Co. under the trademark "ELVAX." "ELVAX-EP 3647-2," which is particularly suitable, contains 30 percent isobutyl acrylate and has a melt index of 30.

Preferred ethylene-isobutyl acrylate copolymers contain from about 28 to about 32 weight percent isobutyl acrylate and have a melt index in the range of about 2 to about 30, preferably from about 2 to about 20.

Suitably, the coating composition can have a wide viscosity range. I have found, however, that in order for the coating composition to have optimum properties with regard to stripping ease, strength, and performance on the curtain coater it is preferable that it have a viscosity in the range of from about 15,000 to about 23,000 c.p.s. as measured at 9.8 sec.$^{-1}$ shear rate and 300° F. This can be accomplished by using mixtures of the various copolymers with the particular wax employed.

When using other coating methods, viscosities outside the above range may be preferred. For example, when dip coating, a lower viscosity to promote faster draining may be an advantage. On the other hand, if the composition is to be cut back with a solvent for spray or brush application, a higher viscosity could be an advantage.

Suitable amounts of petroleum wax and ethylene-vinyl acetate copolymer in the composition of this invention are from about 45 to about 65 parts by weight petroleum wax and from about 35 to about 55 parts by weight ethylene-vinyl acetate copolymer. Preferred amounts are from about 48 to about 55 parts by weight petroleum wax from about 45 to about 52 parts by weight ethylene-vinyl acetate copolymer.

As stated previously, replacement of a portion of the ethylene-vinyl acetate copolymer by an ethylene-isobutyl acrylate copolymer provides an improvement in the high temperature storage stability. Replacement of about 30 percent of the copolymer with ethylene-isobutyl acrylate provides a substantial improvement in this particular property. Replacement of at least about 40 percent of the copolymer with the ethylene-isobutyl acrylate copolymer provides all of the improvement which is ever required. For reason of clarity the composition of this aspect of my invention can be described as follows. The composition, suitably, comprises from about 45 to about 65 parts by weight petroleum wax and from about 35 to about 55 parts of a combination of ethylene-vinyl acetate and ethylene-isobutyl acrylate copolymers, wherein at least about 30 percent by weight, preferably at least about 40 percent by weight, of said combination is ethylene-isobutyl acrylate copolymer. Preferably the composition comprises from about 48 to about 55 parts of petroleum wax and from about 45 to about 52 parts of the combination of ethylene-vinyl acetate and ethylene-isobutyl acrylate copolymer as described immediately in the foregoing.

The composition for forming the strippable coating can be applied to the substrate in a variety of ways. A particularly suitable means of applying the composition is the "curtain coating" technique. In using this technique the substrate is passed through a falling film of the molten composition. The falling film resembles a curtain; hence, the name "curtain coating." This technique is well-known in the coating art. Other means of applying the composition include dipping, extruding, fan spraying (no solvent is required), and solvent-cutback spraying.

The thickness of the coating applied to the substrate is an important variable and is dependent on the specific application. For example, the strength of the coating increases directly with thickness thus improving its stripping properties. A thick coating also offers more protection to the substrate than a thin coating and the degree of protection required will obviously depend upon the particulars surrounding the specific application. In my work coating thickness between about 5 and 20 mils has met the various requirements.

Temperature variables associated with the application method are not critical with regard to stripping properties when using the compositions described herein. For applications where no adhesion is preferred, this is an advantage over compositions containing copolymers of ethylene-vinyl acetate having a vinyl-acetate content of 25 percent or more, or those containing a rosin ester or other tackifier.

For compositions of this invention having a viscosity in the range of 15,000 to 23,000 c.p.s. at 300° F., I have found that an operating temperature between 290° and 390° F. is satisfactory. It is normally preferred, but not required, to use the lowest application temperature that will provide good coating uniformity and weight control. The lowest temperature has the advantage of requiring less cooling time before handling the coated part and also is less severe on the pot life (oxidation stability) of the composition.

As indicated hereinbefore the compositions used in my invention have been used to form strippable coatings on a variety of automotive body trim parts (referred to as "moldings" in the trade). These moldings are presently made of aluminum, anodized aluminum, painted aluminum, stainless steel, vinyl, acrylonitrite-butadiene-styrene (ABS) polymer and combinations of these materials. The moldings range in length from about 2 to 8 feet and in width from about one-half to 4 inches.

In addition to the above-described moldings the compositions described herein can be used as protective, strippable coatings on a wide variety of articles of manufacture. Such articles include decorative moldings, pipes, rods and sheet materials, whether of metal, plastic or wood, used in the home and office building trades. These compositions can also be used to protect critical surfaces used in industry while in storage or transportation as for example die faces used in metal-forming operations. An antirust agent such as calcium sulfonate can be added to the composition if that type of protection is also required.

Previously herein, I have stated that when the coated article is to be stored in hotter climates, the coating must be able to withstand temperatures up to about 150° F. A simply test for measuring this property is to place the coated article in an oven maintained at 150° F. for a short time (16 hours or more). If the coating retains a continuous film and is strippable after cooling to ambient temperature the composition is satisfactory. Failure is indicated by the presence of one or more cracks in the film or objectionable adhesion to the coated article. One form of objectionable adhesion is defined as that which causes the coating to strip in numerous small pieces thus taking a long time to get the article stripped. Another form of objectionable adhesion is when the bulk of the coating may strip easily but some areas remain bonded tightly and require extra effort to remove.

The compositions described herein form a readily strippable film on practically all of the substrates which I have tested. The compositions have been very satisfactory on substrates having very smooth surfaces. For example, the composition has worked well on numerous articles made of anodized aluminum, aluminum, stainless steel, vinyl, acrylonitrile-butadiene-styrene (ABS) polymer and combinations of these materials. It should be noted, however, that the compositions do not provide a readily strippable coating on some surfaces having a microscopic roughness (e.g. certain types of anodized aluminum). When the composition is used in a commercial process it is easy to simply screen the types of materials to be coated prior to subjecting them to the commercial coating process.

In order to disclose the nature of the present invention still more clearly, the following illustrative examples will be given. It is to be understood that the invention is not to be limited to the specific conditions or details set forth in these examples except in so far as such limitations are specified in the appended claims.

EXAMPLE 1

The following compositions were used in this example:

Composition A

| | |
|---|---|
| 18 parts (by weight) | Elvax 460 |
| 32 parts (by weight) | Elvax 420 |
| 50 parts (by weight) | Microcrystalline wax having a melting point (ASTMD-127) of 175° F. min. |

Composition B

| | |
|---|---|
| 48 parts (by weight) | CO-MER Eva-305 |
| 52 parts (by weight) | Microcrystalline wax (same as Composition A) |

Using a curtain coater the above-described compositions were supplied to a large number of automobile moldings, made of material such as aluminum, anodized aluminum, stainless steel, painted aluminum, vinyl and ABS polymer. The coating speed was in the range of 40 to 80 feet per minute and the composition temperature was in the range of 330° to 360° F. The coating thickness was in the range of 15 to 20 mils. With only one exception, the coatings were easily strippable by hand. One type of anodized aluminum was not easily strippable. Examination of this particular molding under the microscope indicated that the surface had a roughness.

EXAMPLE 2

The following compositions were used in this example:

Composition C

| | |
|---|---|
| 22.5 parts (by weight) | Zetafax 1370 |
| 22.5 parts (by weight) | CO-MER EVA-303 |
| 55 parts (by weight) | Microcrystalline wax (same as Composition A) |

Composition D

| | |
|---|---|
| 24 parts (by weight) | Zetafax 1375 |
| 24 parts (by weight) | CO-MER EVA-305 |
| 52 parts (by weight) | Microcrystalline wax (same as Composition A) |

Using a curtain coater the above-described compositions were applied to a large 16 of automobile moldings, made of materials such as aluminum, anodized aluminum, stainless steel, painted aluminum, vinyl and ABS polymer. The coating speed was in the range of 40 to 80 feet per minute and the composition temperature was in the range of 330° to 360° F. The coating thickness was in the range of 15 to 20 mils. With only one exception, the coatings were easily strippable by hand. One type of anodized aluminum was not easily strippable. Examination of this particular molding under the microscope indicated that the surface had a roughness. All of the coatings from the above-described compositions were satisfactory when stored at 150° F. for 16 hours or more.

EXAMPLE 3

This example used a composition containing the following materials:

| | |
|---|---|
| 48 parts (by weight) | CO-MER EVA-305 |
| 52 parts (by weight) | Microcrystalline wax (same as Composition A example 1) |

Using a dip coating method similar to that employed by Lippoldt in U.S. Pat. No. 3,207,716, the composition was applied to a large number of materials such as described in example 1. With the exception of one type of anodized aluminum (having a microscopic roughness) all of the coatings where easily strippable by hand.

In addition to the compositions shown in the foregoing examples the following compositions are suitable to form strippable coatings (all parts stated are parts by weight).

Composition 1

| | |
|---|---|
| 18 parts | Elvax 460 |
| 32 parts | Elvax 420 |
| 50 parts | Paraffin wax having a melting point of 160° F., minimum |

Composition 2

| | |
|---|---|
| 48 parts | CO-MER EVA-305 |
| 52 parts | Paraffin wax* |

Composition 3

| 22.5 parts | Zetafax 1370 |
| 22.5 parts | CO-MER EVA-303 |
| 55 parts | Paraffin wax* |

Composition 4

| 24 parts | Zetafax 1375 |
| 24 parts | CO-MER EVA-305 |
| 52 parts | Paraffin wax* |

*Same as composition 1

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. As an article of manufacture a substrate having a readily strippable coating of a composition consisting essentially of from about 45 to about 65 parts by weight petroleum wax and from about 35 to about 55 parts by weight ethylene-vinyl acetate copolymer, said copolymer containing from about 16 to about 22 weight percent vinyl acetate and having a melt index of from about 1.5 to about 200.

2. The article of manufacture of claim 1 wherein the ethylene-vinyl acetate copolymer contains from about 17 to about 20 weight percent vinyl acetate and has a melt index of from about 2 to about 30.

3. The article of manufacture of claim 2 wherein the composition comprises from about 48 to about 55 parts by weight petroleum wax and from about 45 to about 52 parts by weight ethylene-vinyl acetate copolymer.

4. The article of manufacture of claim 3 wherein the petroleum wax is a microcrystalline wax.

5. The article of manufacture of claim 4 wherein the substrate is an automobile molding.

6. As an article of manufacture a substrate having a readily strippable coating of a composition consisting essentially of from about 45 to about 65 parts by weight petroleum wax having a melting point of at least 160° F. and from about 35 to about 55 parts be weight of a combination of ethylene-vinyl acetate copolymer, said ethylene-vinyl acetate copolymer containing from about 16 to about 22 weight percent vinyl acetate and having a melt index of from about 1.5 to about 200, and ethylene-isobutyl acrylate copolymer, said ethylene-isobutyl acrylate copolymer containing from about 18 to about 32 weight percent isobutyl acrylate and having a melt index of from about 2 to about 260, said combination of ethylene-vinyl acetate and ethylene-isobutyl acrylate copolymers containing at least 30 weight percent ethylene-isobutyl acrylate copolymer.

7. The article of manufacture of claim 6 wherein the combination of ethylene-vinyl acetate and ethylene-isobutyl acrylate copolymers contains at least 40 weight percent ethylene-isobutyl acrylate copolymer.

8. The article of manufacture of claim 7 wherein the composition comprises from about 48 to about 55 parts by weight petroleum wax and from about 45 to about 52 parts by weight of the combination of ethylene-vinyl acetate and ethylene-isobutyl acrylate copolymers.

9. The article of manufacture of claim 8 wherein the ethylene-vinyl acetate copolymer contains from about 17 to about 20 weight percent vinyl acetate and has a melt index of from about 2 to about 30.

10. The article of manufacture of claim 9 wherein the ethylene-isobutyl acrylate copolymer contains from about 28 to about 32 weight percent isobutyl acrylate and has melt index of from about 2 to about 30.

11. The article of manufacture of claim 10 wherein the petroleum wax is a microcrystalline wax.

12. The article of manufacture of claim 11 wherein the substrate is an automobile molding.

13. A method of protecting metal and plastic articles while in shipment, said method comprising: applying to the article a readily strippable coating of a composition consisting essentially of from about 45 to about 65 parts by weight petroleum wax and from about 35 to about 55 parts by weight ethylene-vinyl acetate copolymer, said copolymer containing from about 16 to about 22 weight percent vinyl acetate and having a melt index of from about 1.5 to about 200.

14. The method of claim 13 wherein after shipment and prior to use of said article the readily strippable coating is removed from the article.

15. The method of claim 14 wherein the metal and plastic articles are automobile moldings.

* * * * *